United States Patent
Parker et al.

[15] 3,673,132
[45] June 27, 1972

[54] FOAMS FORMED BY HARDENING EMULSIONS OF GLYCOL IN POLYESTER RESIN

[72] Inventors: Earl E. Parker, Allison Park; Charles B. Friedlander, Pittsburgh, both of Pa.

[73] Assignee: PPG Industries, Inc., Pittsburgh, Pa.

[22] Filed: Dec. 2, 1969

[21] Appl. No.: 881,592

[52] U.S. Cl....................260/2.5 N, 260/22 D, 260/29.6 NR, 260/33.4 R, 260/861
[51] Int. Cl. ............................................................C08j 1/14
[58] Field of Search .................260/2.5 N, 2.5 B, 33.4 R, 228

[56] References Cited

UNITED STATES PATENTS

| 3,255,127 | 6/1966 | Von Bonin et al. | 260/2.5 N |
| 3,256,219 | 6/1966 | Will | 260/2.5 N |
| 3,539,479 | 11/1970 | Alberts | 260/33.4 R |

*Primary Examiner*—Samuel H. Blech
*Assistant Examiner*—Morton Foelak
*Attorney*—Chisholm and Spencer

[57] ABSTRACT

Polyester foams are formed by emulsifying a mixture of glycol in polyester and vinyl monomer and hardening the polyester resin. The resulting polyester resin foam is dimensionally stable, inexpensive to produce, and may be used as furniture, building material and ornamental objects.

8 Claims, No Drawings

FOAMS FORMED BY HARDENING EMULSIONS OF GLYCOL IN POLYESTER RESIN

Molded polyester resins are used extensively as building materials, ornamental objects, furniture, and for many other uses where a strong, inexpensive, shaped object is desired. The polyester resin moldings are formed by polymerizing unsaturated polyesters with ethylenically unsaturated monomers and curing the polyester resin in a shaped mold. The resulting polyester resin assumes the shape of the mold and is cured so that it is hard.

In order to make the molded objects inexpensively, it has been proposed to add water to the unsaturated polyesters and ethylenically unsaturated monomers and subsequently form a water in polyester-vinyl monomer emulsion and then cure the polyester resin in a mold. In this manner, the hardened emulsion mold contains the separate water droplets as the discontinuous phase and the polyester resin as the continuous phase. Thus, when the polyester resin phase in hardened, the resulting material is a foam containing a closed cell polyester resin matrix having a plurality of interstices of water.

The shaped materials resulting from the use of water in polyester resin emulsions have the disadvantage of losing weight over periods of time and after the passage of a somewhat less than reasonable amount of time develop cracks and numerous other imperfections due to the seeping of water through the hardened emulsion. Hence, their use as furniture and ornamental objects has been somewhat limited as these objects are dimensionally unstable and tend to crack and lose their shape and weight.

It has now been discovered that shaped materials which will not lose weight over a period of time and having comparable strength to that of the shaped materials formed from water and polyester-vinyl monomer emulsions may be made inexpensively by emulsifying a glycol and a mixture of polyester and vinyl monomer in which the glycol is immiscible and curing the polyester resin phase of the emulsion so that a polyester resin matrix containing interstices of glycol is formed. The resulting molding is extremely crack-resistant.

Thus, shaped, articles may be formed by adding a glycol to a copolymerizable mixture of an ethylenically unsaturated polyester and a copolymerizable ethylenically unsaturated monomer such as styrene. The resulting mixture is then agitated and a lipophilic emulsifier is added to the mixture in order to obtain a stable glycol in polyester resin emulsion. The polyester resin phase of the emulsion which, of course, is the continuous phase or the matrix which contains separate droplets of glycol in its interstices is hardened to form a stiff closed cell material without destroying the dispersed character of the glycol. The material may be hardened in a mold and the hardened foam assumes the shape of the mold.

The continuous phase of the emulsion comprises the polyester-vinyl monomer phase. The polyester resin is formed by copolymerizing the mixture of an ethylenically unsaturated polyester and a polymerizable ethylenically unsaturated monomer copolymerizable with the polyester. The copolymerization or hardening of the polyester resin around the glycol takes place after the glycol in polyester-vinyl monomer emulsion is formed.

The polyesters used herein are unsaturated polyesters prepared by condensing one or more dicarboxylic acids or their anhydrides with one or more polyols wherein one or more of the dicarboxylic acids is ethylenically unsaturated. The ethylenically unsaturated polycarboxylic acids include such acids as:
  maleic acid
  fumaric acid
  aconitic acid
  mesaconic acid
  citraconic acid
  itaconic acid
and halo and alkyl derivatives of such acids and the like; the preferred acid being maleic acid. The anhydrides of these acids, where the anhydrides exist, are, of course, embraced under the term "acid", since the polyesters obtained therefrom are essentially the same whether the acid or anhydride is utilized in the reaction. The ethylenically unsaturated dicarboxylic acids are conventionally employed in an amount of about 10 mole percent to about 100 mol percent, although preferably in an amount of about 20 mole percent to about 80 mole percent of the total moles of acid component in the polyester.

The polyhydric alcohols useful in preparing unsaturated polyesters include:
  ethylene glycol
  diethylene glycol
  triethylene glycol
  polyethylene glycol
  propylene glycol
  dipropylene glycol
  polypropylene glycol
  glycerol
  neopentyl glycol
  pentaerythritol
  trimethylol propane
  trimethylol ethane
and the like. The preferred polyols for the purposes of this invention have a molecular weight of less than about 2,000 and consist essentially of carbon, hydrogen and oxygen. The polyhydric alcohols are generally employed in an equal molar ratio to the total acid components, or as a slight excess, as, for example, about 5 mole percent excess.

Saturated dicarboxylic acids may be utilized in combination with the unsaturated acid or anhydride in the preparation of unsaturated polyesters. Such acids increase the length of the polyester without adding additional cross-linking sites, which is a desired feature in some polyesters. Examples of useful dicarboxylic acids which are either saturated or only aromatically unsaturated include:
  succinic acid
  adipic acid
  suberic acid
  azelaic acid
  sebacic acid
  phthalic acid
  isophthalic acid
  terephthalic acid
  tetrachlorophthalic acid
  hexachloroendomethylenetetrahydrophthalic acid
and the like. As in the case of the ethylenically unsaturated acids, the anhydrides of these acids, where the anhydrides exist, are, of course, embraced in the term "acid", since the polyesters obtained therefrom are the same. Furthermore, for purposes of the present invention, the aromatic nuclei of such acids as phthalic acid are generally regarded as saturated since the double bonds do not react by addition, as do ethylenic groups. Therefore, wherever the term "saturated dicarboxylic acid" is utilized, it is to be understood that such term includes the aromatically unsaturated dicarboxylic acids. Such "saturated carboxylic acids" may also be referred to as "non-ethylenically unsaturated" polycarboxylic acids.

The vinyl monomers mixed with the above unsaturated polyesters may be any ethylenically unsaturated monomer which is copolymerizable with the polyester and in which the polyester is soluble and which is capable of forming an emulsion with the glycol and polyester. Examples of such monomers are:
  styrene
  halogenated styrenes
  vinyl toluene
  divinyl benzene
  octyl acrylate
  octyl methacrylate
and the like. The preferred monomers are liquid compounds, soluble in the polyester components. Such monomers should preferably be free of non-aromatic carbon-carbon conjugated double bonds.

The monomer component or components may be employed over a broad range, but usually the proportion thereof, upon a weight basis, will be less than the polyester component. The amount of monomer should be sufficient to provide a liquid, flowable, interpolymerizable mixture. Ordinarily, the percentage of monomer will fall within the range of about 10 percent to about 60 percent by weight of the total mixture of polyester and monomer. At the preferred range, the monomer is present in an amount of about 20 percent to about 50 percent.

The glycol is added to the polyester-vinyl monomer mixture and the emulsion is formed. Any liquid glycol which is immiscible with the polyester resin formed may be used. Examples of the polyhydric alcohols or glycols which may be used are ethylene glycol, glycerine, propylene glycol, diethylene glycol, and the like. The most preferred glycol is ethylene glycol.

Although it is preferred that the glycol be added alone, it may be added as a solution in other materials wherein the glycol comprises at least about 80 percent by weight of the solution.

The amount of glycol added to the mixture of polyester and vinyl monomer may be up to about 80 percent by weight of the mixture. Preferably, the emulsion contains 50 percent by weight of the polyester-vinyl monomer mixture and 50 percent by weight of the glycol.

The mixture of the polyester and vinyl resin and glycol is formed into an emulsion after the addition of an emulsifier. The emulsifier used must be predominantly lipophilic. In other words, the HLB number (hydrophilic-lipophilic balance) must be low. The preferred HLB number is from 2 to 8. These emulsifiers will affect the formation of glycol in polyester emulsions rather than polyester in glycol emulsions where the glycol phase would be the continuous phase and the polyester-vinyl monomer mixture would form the interstices. Examples of lipophilic emulsifiers are nonionic mono-, di-, tri-, etc., esters formed between polyhydroxy alcohols and fatty acids, such as sorbitan sesquioleate, sorbitan monostearate, sorbitan monooleate, sorbitan monopalmitate, propylene glycol monolaurate, diethylene glycol monooleate, diethylene glycol monostearate, a polyoxyethylenesorbitol derivative of beeswax, glyceryl monostearate, and mixtures thereof. The amount of emulsifier added is generally from about 0.1 to about 10 percent by weight of the mixture.

The emulsion is prepared by adding the emulsifier to the mixture of polyester-vinyl monomer and glycol. The glycol may be added either before or after the addition of the emulsifier. The mixture is then agitated by any means to form the emulsion. No specific temperature control is necessary so long as the mixture remains liquid.

The polyester-vinyl monomer phase of the emulsion is hardened or copolymerized by the addition of a free-radical forming catalyst such as an organic peroxide.

It will be realized that other radical-forming compounds such as azonitriles can also be used. Any peroxide that is a liquid or is soluble in the emulsion is suitable for use. Specific examples of such peroxides are methyl ethyl ketone peroxide, benzoyl peroxide, tert-butyl hydroperoxide, isopropyl peroxydicarbonate, dichlorobenzoyl peroxide, acetyl peroxide, cumene hydroperoxide and cyclohexyl hydroperoxide. The compound forming free-radicals is used in a concentration that is required for the rapid initiation of the hardening of the polyester and the vinyl monomer. This concentration varies with the conditions of hardening and with the nature of the polyester, and is generally between 0.001–10 weight-percent based on the vinyl monomer.

If the free-radical initiator is added before the emulsion has been formed, the polyester-vinyl monomer mixture may have a tendency to gel prematurely. To guard against such an occurrence, an inhibitor is generally added. Some examples of inhibitors which may be added are:
P-benzoquinone
chloranil
hydroquinone
3-isopropyl catechol
3-methyl catechol
4-isopropyl catechol
trimethylamine hydrochloride
N-benzylaniline hydrochloride
trimethyl benzyl ammonium acid oxalate
trimethyl benzyl ammonium maleate
trimethyl benzyl ammonium chloride
and the like. The amount of inhibitor used is susceptible to wide variation, but conveniently is in a range of about 0.001 percent to about 0.1 percent by weight based on the polyester component of the mixture.

The above-mentioned organic peroxide catalysts decompose very slowly at room temperature; they must be made to decompose for the formation of a free-radical which is to initiate the hardening reaction. Normally, temperatures of 65° C. and higher are required to reach a satisfactory hardening time. The mixture of polyester and vinyl monomer can however be hardened at room temperature if the mixture incorporates a suitable promoter, facilitating the decomposition of the peroxide. The type of promoter used depends on the nature of the organic peroxide employed as a radical-forming catalyst. Tertiary aromatic amines such as dimethylaniline or p-toluidine are very effective promoters for diacyl peroxides such as benzoyl peroxide. Similarly, cobalt salts, such as cobalt naphthenate, are very effective promoters for ketone peroxides such as methyl ethyl ketone peroxide. In the present invention, the addition of a promoter is preferred, because the stability of the emulsion may be lost when the emulsion is heated to the temperature that is required for the hardening in the absence of a promoter. If only a somewhat elevated temperature is required, however, no promoter need be introduced. The amount of promoter generally needed varies between about 0.1 and 5 weight-percent and preferably between about 0.2 and 0.5 weight-percent of the polyester-vinyl monomer mixture. The mixtures may be modified by the addition of fillers, pigments, and other materials, if desired.

The emulsions are hardened by setting the emulsions in a mold and adding the free-radical catalyst and, if desired, heating at elevated temperatures. In this way, the polyester resin phase copolymerizes forming a closed cell matrix wherein the glycol droplets are dispersed in the interstices of the polyester resin matrix. The hardened emulsion takes the shape of the mold.

The hardened emulsions may be used as ornamental objects, furniture, wood substitutes, building materials, etc. As the hardened emulsions will not lose their shape, they are most useful as furniture, and as the glycol droplets will not escape, forcing the hardened emulsions to crack, ornaments which are extremely economical to form may be produced by the method of this invention.

The following examples set forth specific embodiments of the instant invention; however, the invention is not to be construed as being limited to these embodiments, for there are, of course, numerous possible variations and modifications.

EXAMPLE 1

A hardened unsaturated polyester resin matrix having a plurality of interstices of glycol was formed in the following manner.

A reactor was charged with 100 grams of a polyester composition comprising 50 percent styrene, 0.01 percent methyl hydroquinone and 50 percent of a polyester having the following composition:

|  | Moles |
|---|---|
| Maleic anhydride | 8 |
| Dimerized fatty acid formed by dimerizing 2 monobasic acids containing 18 carbon atoms (Empol 1014) | 2 |
| Neopentyl glycol | 10.9 |

The polyester were added 2 cubic centimeters of cobalt octoate accelerator, and the mixture was stirred. To the mixture were then added 3 grams of sorbitan sesquioleate. After agitating the mixture, 100 grams of ethylene glycol were added. After further agitation, 0.5 cubic centimeters of dimethylaniline and 0.5 gram of methyl ethyl ketone peroxide were added and the mixture was vigorously agitated to form the glycol in polyester-vinyl monomer emulsion.

The emulsion was poured in a mold and hardened in 10 minutes at room temperature.

The resulting casting is hard, crack-resistant, and dimensionally stable.

EXAMPLE 2

A hardened unsaturated polyester resin matrix having a plurality of interstices of glycol was formed in the following manner.

A reactor was charged with 100 grams of a polyester composition comprising 50 percent styrene, 0.01 percent methyl hydroquinone and 50 percent of a polyester having the following composition:

|  | Moles |
|---|---|
| Isophthalic acid | 6 |
| Maleic anhydride | 4 |
| Propylene glycol | 11.5 |

To the polyester were added 2 cubic centimeters of cobalt octoate accelerator, and the mixture was stirred. To the mixture were then added 3 grams of sorbitan sesquioleate. After agitating the mixture, 100 grams of ethylene glycol were added. After further agitation, 0.5 cubic centimeter of dimethylaniline and 0.5 gram of methyl ethyl ketone peroxide was added and the mixture was vigorously agitated to form the glycol in polyester-vinyl monomer emulsion.

The emulsion was poured in a mold and hardened in 10 minutes at room temperature.

The resulting casting is hard, crack-resistant, and dimensionally stable.

EXAMPLE 3

A hardened unsaturated polyester resin matrix having a plurality of interstices of glycol was formed in the following manner.

A reactor was charged with 100 grams of a polyester composition comprising 20 percent styrene, 0.01 percent methyl hydroquinone and 80 percent of a polyester having the following composition:

|  | Moles |
|---|---|
| Phthalic anhydride | 4 |
| Maleic anhydride | 6 |
| Propylene glycol | 10.6 |

To the polyester were added 3 grams of sorbitan sesquioleate. After agitating the mixture, 100 grams of propylene glycol were added. After further agitation, 0.5 cubic centimeter of dimethylaniline and 0.5 gram of benzoyl peroxide was added and the mixture was vigorously agitated to form the glycol in polyester-vinyl monomer emulsion.

The emulsion was poured in a mold and hardened in 10 minutes.

The resulting casting is hard, crack-resistant, and dimensionally stable.

EXAMPLE 4

A hardened unsaturated polyester resin matrix having a plurality of interstices of glycol was formed in the following manner.

A reactor was charged with 100 grams of a polyester composition comprising 40 percent styrene, 0.01 percent methyl hydroquinone and 60 percent of a polyester having the following composition:

|  | Moles |
|---|---|
| Phthalic anhydride | 2 |
| Maleic anhydride | 8 |
| Diethylene glycol | 10 |

To the polyester were added 2 cubic centimeters of cobalt octoate accelerator, and the mixture was stirred. To the mixture were then added 3 grams of sorbitan sesquioleate. After agitating the mixture, 100 grams of glycerine were added. After further agitation, 0.5 cubic centimeter of dimethylaniline and 0.5 gram of methyl ethyl ketone peroxide were added and the mixture was vigorously agitated to form the glycol in polyester-vinyl monomer emulsion.

The emulsion was poured in a mold and hardened in 10 minutes at room temperature.

The resulting casting is hard, crack-resistant, and dimensionally stable.

EXAMPLES 5–13

The stability of glycol-extended polyesters was compared to the stability of water-extended polyesters and the results are described below.

A series of molds were made by hardening various glycol in polyester emulsions and water in polyester emulsions. The molds were then tested for weight losses at room temperature, 100° F., and at 150° F. for various periods of time.

Table 1 shows the results of this test, wherein resin A comprises 50 percent styrene and 50 percent of a polyester having the composition:

|  | Moles |
|---|---|
| Maleic anhydride | 8 |
| Dimerized fatty acid formed by dimerizing 2 monobasic acids containing 18 carbon atoms (Empol 1014) | 2 |
| Neopentyl glycol | 10.9 | and Resin B comprises 50 percent styrene and 50 percent of a polyester having the composition:

|  | Moles |
|---|---|
| Isophthalic acid | 6 |
| Maleic anhydride | 4 |
| Propylene glycol | 11.5 |

TABLE 1

| Example | Resin | Percent resin | Glycol | Percent glycol | Percent water | Time tested (days) | Percent weight loss Room temperature | 100° F. | 150° F |
|---|---|---|---|---|---|---|---|---|---|
| 5 | A | 50 | Ethylene glycol | 50 |  | 90 | 0 | 3 | 2 |
| 6 | A | 44 | do | 56 |  | 90 | 0 | 2.5 | 3 |
| 7 | A | 50 | Glycerine | 50 |  | 90 | 0 | 0.5 | 2.5 |
| 8 | A | 40 | do | 60 |  | 90 | 0 | 0.5 | 2.5 |
| 9 | A | 33 | do | 67 |  | 90 | 0 | 0 | 2 |
| 10 | A | 50 | Propylene glycol | 50 |  | 90 | 0 | 0 | 4 |
| 11 | B | 50 | Glycerine | 50 |  | 90 | 0 | 0 | 1.5 |
| 12 | B | 40 | do | 60 |  | 90 | 0 | 0.5 | 1.8 |
| 13 | B | 33 | do | 67 |  | 90 | 0 | 0 | 2.5 |
| Control C | A | 50 |  |  | 50 | 65 | 5.3 | 8.2 | 20.6 |
| Control D | A | 50 |  |  | 50 | 110 | 7.2 | 10.6 | 28.2 |

As seen from the preceding Table, the glycol-extended polyesters sustained only a minimal weight loss while the water-extended polyesters suffered substantial weight losses.

The comparative weight loss of the water-extended polyester is even greater than is apparent from the above Table, as the glycol-extended polyesters did not lose additional weight after a 90-day period whereas the water-extended polyesters continued to lose weight after this time.

Although specific examples of the instant invention have been set forth hereinabove, it is not intended that the invention be limited solely thereto, but to include all the variations and modifications following within the scope of the appended claims.

We claim:

1. A hardened unsaturated polyester resin matrix having a plurality of interstices of a solution wherein glycol comprises at least about 80 percent by weight of the solution and the solution containing glycol is dispersed throughout the polyester resin phase as separate droplets and wherein the polyester resin comprises the copolymer of
   a. an unsaturated polyester, and
   b. an ethylenically unsaturated monomer which is soluble in the polyester and capable of forming an emulsion with glycol and the polyester.

2. The hardened matrix of claim 1 wherein the ethylenically unsaturated monomer is styrene.

3. The hardened matrix of claim 1 wherein the glycol is ethylene glycol.

4. The hardened matrix of claim 1 wherein the polyester resin comprises from about 40 percent to about 90 percent by weight of unsaturated polyester and from about 10 percent to about 60 percent by weight of ethylenically unsaturated monomer.

5. The method of preparing a hardened glycol in polyester resin emulsion in which the polyester resin phase is hardened and the glycol phase remains as separate droplets dispersed throughout the polyester resin phase comprising adding a solution wherein glycol comprises at least about 80 percent by weight of the solution to a mixture of unsaturated polyester and an ethylenically unsaturated monomer which is soluble in the polyester and capable of forming an emulsion with glycol and the polyester and a predominantly lipophilic emulsifier and agitating the mixture to form an emulsion, and the polyester resin phase is hardened by free-radical catalysis thus polymerizing the monomer.

6. The method of claim 5 wherein the emulsifier comprises from 0.1 percent to about 10 percent by weight of the mixture.

7. The method of claim 5 wherein the glycol is ethylene glycol.

8. The method of claim 5 wherein the polyester resin phase is hardened by adding to the emulsion a free-radical forming catalyst and heating the emulsion to activate the catalyst.

* * * * *